United States Patent Office 3,725,247
Patented Apr. 3, 1973

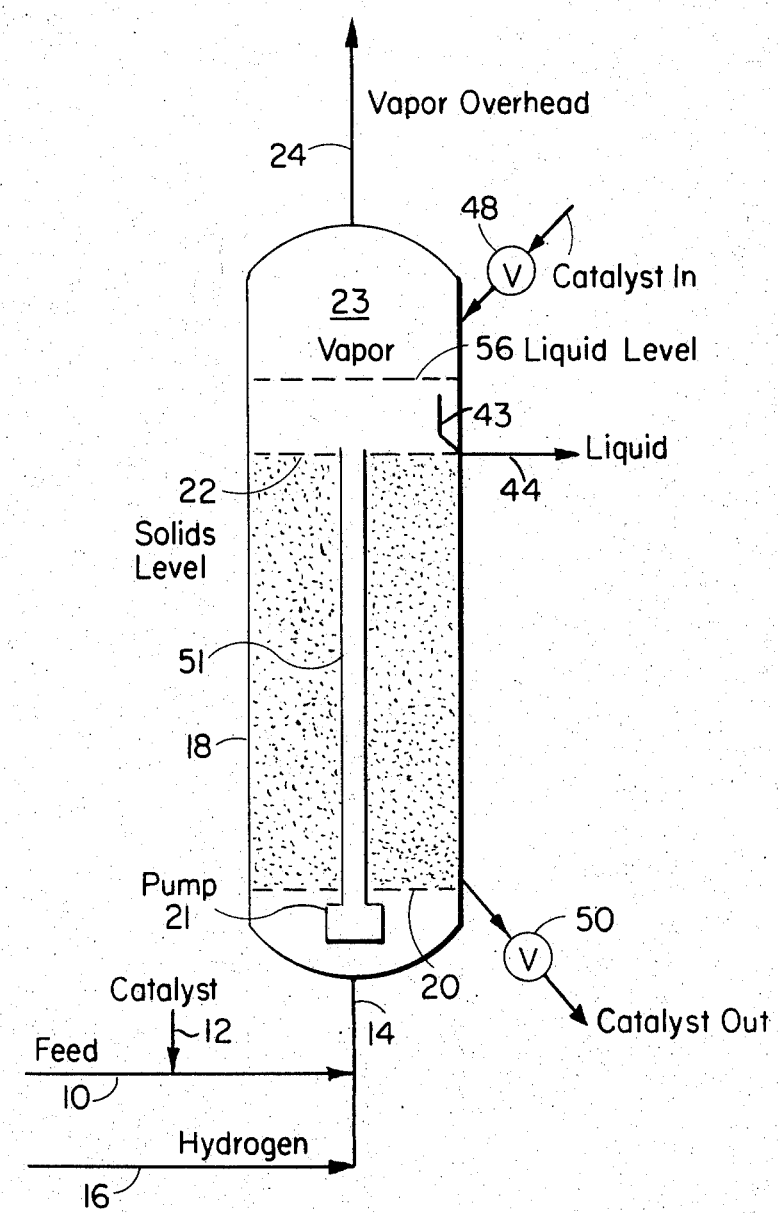

3,725,247
HYDROGENATION OF RESIDUUM
Axel R. Johnson, North Babylon, N.Y., and Ronald H. Wolk, Trenton, N.J., assignors to Hydrocarbon Research, Inc., New York, N.Y.
Filed Mar. 20, 1972, Ser. No. 236,359
Int. Cl. C10g 9/16, 13/02, 23/02
U.S. Cl. 208—111          7 Claims

ABSTRACT OF THE DISCLOSURE

In the hydroconversion of certain petroleum stocks, such as Lloydminster crude mixtures from Canadian sources, acceptable desulfurization levels can only be obtained by the use of a desulfurization catalyst operating in upflow liquid phase in accordance with the ebullated bed system by maintaining a conversion rate such that a maximum heptane insoluble number of 60 is not exceeded.

BACKGROUND OF THE INVENTION

The ebullated bed system described by Johanson in U.S. Reissue Pat. 25,770 has proved successful in hydrogenation of petroleum residuum, including hydrocracking and hydrodesulfurization of a wide variety of stocks. The advantages of high throughput, uniform temperature, low presure drop and non-plugging characteristics have been of great benefit to residuum processes. Liquid phase conditions assure good catalyst contact with no substantial attrition, and with the internal recirculation the catalyst bed has an average age which can be easily changed, without stopping the operation, by the mere addition or withdrawal of catalyst.

In processing certain residua, such as Lloydminster, which contains a substantial content of asphaltenes, it was observed that during apparently "satisfactory" operations a tarry, sticky material which was continuously formed over a period of 4–5 days on steam (0.5 bbl./lb. catalyst age) at 80% conversion, and over a 14-day on-stream period (1.7 bbl./lb. catalyst age) at 70% conversion, was adsorbed by the catalyst particles, and ultimately filled particle interstices. Higher velocities were required in order to keep the bed expanded some 50% over its settled volume so operations could be carired out. As sticky material was continuously adsorbed on the catalyst, increasing velocities were made necessary in order to ebullate a relatively few particles which were stuck together, or to continuously break up incipient agglomerated masses of catalyst that were lightly bound but which behaved as though of larger particle size. Once the particles became more firmly stuck together as conglomerates of catalyst, part of the charge stock channeled through the imperfectly ebullated catalyst bed.

If only a relatively small portion of the main flow of fresh feed channled, poor catalyst performance would be observed. However, as an increasing portion of the feed channeled, that portion of the feed moving relatively slowly had long hold-up times in the reactor and became over-converted. Even though the overall conversion level was constant, local areas of over-conversion consumed a large quantity of hydrogen and the heat of reaction resulted in poor temperature control. Ultimately "hot spots" in the catalyst bed were observed.

If a layer of conglomerates formed across the reactor cross-section, a piston-like action of solid in an upward direction resulted in the observed sharp movement of catalyst upwardly and over into the recycle collection pan.

SUMMARY OF THE INVENTION

The hydroconversion of a residuum hydrocarbon oil feedstock having at least 60 weight percent boiling above 975° F. such as Lloydminster and similar residuum materials containing substantial amounts of asphaltenes can be accomplished on a continuous high level basis in an ebullated bed system by limiting conversion to not exceed a critical heptane insoluble number. This can be accomplished by lower temperatures, higher pressures and maintaining a catalyst addition rate such that this heptane number is not reached or by adding a diluent or combinations thereof.

DESCRIPTION OF THE DRAWING

The drawing is a schematic view of an ebullated bed reactor.

PREFERRED FORM OF EMBODIMENT

As more specifically shown in the drawing, an asphaltene containing residuum feed 10 is combined with a catalyst 12 and fed by line 14 with hydrogen from line 16 upflow through a reactor generally designated 18. This reactor is typical of that shown in U.S. Reissue Pat. No. 25,770. The reactor has a liquid distributor and catalyst support 20 so that the liquid and gas passing upwardly through the reactor 18 will tend to put the catalyst in random motion in the liquid.

The catalyst particle size range is usually a narrow size range for uniform expansion under controlled liquid and gas flow conditions. While the range is a close sizing of particles usually between 3 and 325 mesh (USS), with an upflow liquid velocity between 10 and 100 gallons per minute per square foot of reactor cross section, the catalyst is usually the larger particles of 3 to 20 mesh size including extrudates of approximately $\frac{1}{32}$ x $\frac{3}{16}$". We also contemplate a so-called once through operation using catalyst in the 80–270 mesh range with a liquid velocity in the order of 1–10 gallons per minute per square foot of horizontal reactions space. The liquid flow rate, the density of the catalyst and the lifting effect of the hydrogen are factors in the buoyancy of the catalyst.

By control of the catalyst particle size and density and liquid and gas velocities and taking into account the viscosity of the liquid under the operating conditions, the catalyst bed may be expanded to have a definite level or interface in the liquid as indicated at 22. The settled level of the catalyst is considerably lower than level 22. Normally, bed expansion should be at least 10% and seldom over 300% of the static level.

In a reactor system of this type, a vapor space 23 is provided above the liquid level 56 from which a vapor overhead, completely free of liquid, is removed at 24. The gaseous portion which is largely hydrogen, may be recovered by conventional means and after being reheated can be recycled to the feed line 14 to the reactor.

A heavy liquid, substantially free of catalyst, is separated from the liquid effluent in the upper part of reactor 18 by trap tray 43 and drawn off at 44.

The hydrogenation reaction is facilitated by the use of catalyst and if a finely ground catalyst is used, it is effectively introduced to the reactor at 12 wherein it may be added continuously in the desired concentration as in a slurry. Catalyst may also be added to the reactor 18 through suitable inlet means 48 and withdrawn by suitable draw-off means 50 at a rate between 0.1 and 0.2 lb. catalyst/bbl. feed.

The catalyst is a typical hydrogenation catalyst from the group of cobalt, molybdenum, nickel and tungsten and mixtures thereof carried by a support from the group of silica, alumina and mixtures thereof.

Circulation of liquid from above the solids interface 22 to below the distributor deck 20 is usually desirable to assure completeness of the reaction and to establish a sufficient upflow liquid velocity to assist in maintaining the catalyst in random motion in the liquid. This is preferably accomplished by the use of a central conduit 51 which extends to a pump 21 below the distributor deck 20 to assure a positive and controlled movement of the liquid upwardly.

The recycle of liquid through internal conduit 51 has many mechanical advantages and tends to eliminate external high pressure connections as would be required in a hydrogenation reactor. Nevertheless, as described in the Johanson U.S. Reissue Pat. No. 25,770, recycle can be established by an external pump on heavy liquid line 44 with a connection back to feed line 14.

Operability of the ebullated bed system to assure contact and uniform (iso-thermal) temperature depends on the random motion of the relatively small catalyst in the liquid environment resulting from the buoyant effect of the upflowing liquid and gas. With a non-uniform distribution of liquid flow, upsets take place, usually resulting in coke deposits.

Different feedstocks are found to have more or less asphaltene precursors which tend to aggravate the operability of the pumps and recycle piping due to the plating out of tarry deposits. While these can be washed off by lighter diluent materials, the unit may become completely coked up and require premature shut down.

We have found that we can anticipate such condition by the use of a test procedure which we designate as the heptane insoluble number (HIN). Such test, an adaptation of ASTM (American Society for Testing Materials) test D 1796 is as follows:

50 cc. of reactor liquid are mixed with an equal volume of heptane, heated to 120° F. and centrifuged for twenty minutes. The material thrown out of solution, expressed as a percentage of the oil is designated the HIN (heptane insoluble number).

As described hereinafter, certain tests were made on a Lloydminster Bottoms of the following type:

INSPECTION ON LLOYDMINSTER BOTTOMS

| | |
|---|---|
| Gravity ° API | 10 |
| Sulfur, wt. percent | 4 |
| Distillation, ° F.: | |
| IBP | 611 |
| 10 | 787 |
| 20 | 860 |
| 30 | 941 |
| V percent to 975° F. | 37.7 |
| Vanadium, p.p.m. | 130 |
| Nickel, p.p.m. | 65 |
| H/C atomic ratio | 1.55 |
| Ramsbottom Carbon, wt. percent | 13.7 |
| Viscosity SFS at 210° F., sec. | 98.9 |
| Viscosity SFS at 250° F., sec. | 40.5 |
| Benzene insoluble, wt. percent | 0.1 |
| Nitrogen, wt. percent | 0.36 |
| ASTM ash, wt. percent | 0.17 |
| IBP—975° F.: | |
| Gravity, ° API | 19.5 |
| Sulfur, wt. percent | 2.30 |
| 975° F. plus: | |
| Gravity, ° API | 4.6 |
| Sulfur, wt. percent | 5.43 |

A number of runs were made varying the factors of catalyst, catalyst age, space velocity, hydrogen throughput, temperature and pressure.

The following examples give the operating details:

Example I

Operations were conducted at the conditions indicated in Column A. The run had to be terminated when the heptane insoluble number exceeded 60. The temperature profile in the reactor which had indicated essentially isothermal operation when the heptane number was 40 had deteriorated in that temperature differences between thermocouples at different elevations in the reactor showed differences of 10° F.

Example II

The run was repeated at all the same conditions with the exception of the catalyst replacement rate which was increased from 0.10 pound per barrel to 0.20 pound per barrel. No operating difficulties were encountered and the heptane insoluble number never exceeded 37 as shown in Column B.

Example III

Table I compares the operation previously presented in Column B with an operation at lower temperature and, therefore, lower conversion at the conditions of Column C. At the lower conversion satisfactory operation was obtained with a heptane insoluble number of 35.

Example IV

Column D shows the same feed as was used previously in the operation given in Column B with the exception of a 0.25/1 recycle of 650–1000° F. heavy gas. Throughout the run the heptane number remained at 45 and operation was satisfactory.

TABLE I

| | A | B |
|---|---|---|
| Feed | Lloydminster bottoms | |
| Gravity, °API | 10 | |
| Sulfur, wt. percent | 4 | |
| Volume percent boiling below 975° F | 38 | |
| Asphaltene content | | |
| Temperature, ° F | 825 | 825 |
| Hydrogen partial pressure, p.s.i.g | 2,200 | 2,200 |
| Volume percent disappearance of 975° F plus feed (conversion) | 77 | 77 |
| Catalyst addition rate, lb./bbl | 0 10 | 0 20 |
| Heptane insoluble number | 60 | 40 |
| Unit operability | (¹) | (²) |

| | C | D |
|---|---|---|
| Feed | Lloydminster bottoms | |
| Gravity, °API | 10 | |
| Sulfur, wt. percent | 4 | |
| Volume percent boiling below 975° F | 38 | |
| Asphaltene content | | |
| Temperature, ° F | 810 | 825 |
| Hydrogen partial pressure, p.s.i.g | 2,200 | 2,200 |
| Volume percent disappearance of 975° F plus feed (conversion) | 62 | 77 |
| Catalyst addition rate, lb/bbl | 0.10 | 0 10 |
| Heavy gas oil recycle (650–1,000° F.) $V_r/V_f$ | | 0.25 |
| Heptane insoluble number | 35 | 45 |
| Unit operability | (²) | (²) |

¹ Unsatisfactory due to catalyst agglomeration.
² Satisfactory.

It was discovered that although it was desirable to operate the hydrogenation reactor so as to have a heptane insoluble number of less than 60 with the Lloydminster crude it was preferable to have a heptane insoluble number of less than 50. The diluent to be combined with the feed to maintain the desired HIN preferably boils between 650 and 1000° F.

While a preferred form of embodiment of the invention has been shown and described, modifications may be made thereto within the scope and spirit of the disclosure herein and of the claims appended hereinafter.

We claim:

1. A process for enhancing the operability of an ebullated bed system for the hydroconversion of a residuum hydrocarbon oil feedstock having at least 60 weight percent boiling above 975° F. and composed substantially of asphaltenes, wherein the feedstock and hydrogen pass upwardly through a reaction zone containing particulate catalysts from the group of cobalt, molybdenum, nickel and tungsten and mixtures thereof supported by a carrier from the group of alumina, silica and mixtures thereof, under conditions to place the catalyst in random motion in the liquid, said catalyst having a close size in the range of 3 to 325 mesh (U.S. Standard), and wherein catalyst in the reaction zone is continuously replaced by continuous removal and addition of the catalyst, and hydroconversion conditions are maintained in the reaction zone in a temperature range between about 750 and 850° F., and total pressures are in the range of 1000–3000 p.s.i.g., the improvement which comprises maintaining reaction conditions such that the effluent from the reaction zone has a heptane insoluble number under 60.

2. A process as claimed in claim 1 wherein the feedstock is Lloydminster bottoms, and the heptane insoluble number is kept below 50.

3. A process as claimed in claim 1 wherein the catalyst replacement rate is maintained above 0.10 pound of catalyst per barrel of feedstock charged.

4. A process as claimed in claim 1 wherein a diluent is added to the feedstock.

5. A process as claimed in claim 1 wherein conversion conditions are maintained mild by increase in pressure and decrease in temperature.

6. A process as claimed in claim 1 wherein conversion conditions are maintained mild by increase in space velocity (volume of feed per hour per volume of reaction space).

7. A process as claimed in claim 2 wherein the catalyst replacement rate is maintained in the range of 0.10 to 0.20.

References Cited
UNITED STATES PATENTS

| | | | |
|---|---|---|---|
| 3,505,208 | 4/1970 | Vaell | 208—111 |
| 3,549,517 | 12/1970 | Lehman et al. | 208—108 |
| 3,554,898 | 1/1971 | Wood et al. | 208—59 |
| 3,579,436 | 5/1971 | Mounce | 208—59 |
| 3,681,231 | 8/1972 | Alpert et al. | 208—59 |

DELBERT E. GANTZ, Primary Examiner

G. E. SCHMITKONS, Assistant Examiner

U.S. Cl. X.R.

208—48R, 112, 216